United States Patent [19]

Spector

[11] 3,709,868
[45] Jan. 9, 1973

[54] OPIUM ALKALOID ANTIGENS AND ANTIBODIES SPECIFIC THEREFOR

[75] Inventor: Sidney Spector, Livingston, N.J.

[73] Assignee: Hoffman-La Roche Inc., Nutley, N.J.

[22] Filed: March 8, 1971

[21] Appl. No.: 122,204

Related U.S. Application Data

[63] Continuation-in-part of Ser. No. 36,999, May 13, 1970, abandoned.

[52] U.S. Cl. ............260/121, 260/112 R, 260/112 B, 260/112.5, 260/209 R, 424/1, 424/12, 424/85
[51] Int. Cl. .........................C07g 7/00, A61k 23/00
[58] Field of Search .........424/85; 260/112, 119, 121

[56] References Cited

UNITED STATES PATENTS

| 2,301,532 | 11/1942 | Fell | 140/57 |
|---|---|---|---|
| 2,372,066 | 3/1945 | Fell | 260/112 |
| 1,906,236 | 5/1933 | Pitkin | 424/96 |

FOREIGN PATENTS OR APPLICATIONS

| 116,806 | 9/1899 | Germany |
|---|---|---|

OTHER PUBLICATIONS

Journal of Immunology, 38, pp. 479–490 (1940) Hooker et al.
Atti and Accad. Italia, Rend. Classe Sci. 2 (7), pp. 1103–1106 (1941), Mingola et al.
Chem. Abstracts, Vol. 29, 1935, 8017$^a$, 8018$^b$ Ma Scherpa.
Chem. Abstracts, Vol. 61, 1964, 9914$^4$,$^7$ Kramarenko.
Chem. Abstracts, Vol. 73, 1970, 5416d, Spector et al.

*Primary Examiner*—Howard E. Schain
*Attorney*—Samuel L. Welt, Jon S. Saxe, Bernard S. Leon, Ronald A. Schapira and William H. Epstein

[57] ABSTRACT

Opium alkaloid antigens are prepared by coupling opium alkaloid haptens to immunogenic carrier materials. In preferred embodiments proteins are used as carrier materials and the coupling is effected through the carboxyl group of a carboxy lower alkyl derivative of the phenolic hydroxy group of said alkaloid and a free amino group on the protein thereby yielding a covalent peptide bond. The resulting antigens produce immunological effects when injected into host animals, including the formation of opium alkaloid specific antibodies. These specific antibodies are useful in bioanolytical techniques for the assay of opium alkaloids in biological fluids.

5 Claims, No Drawings

OPIUM ALKALOID ANTIGENS AND ANTIBODIES SPECIFIC THEREFOR

RELATED APPLICATIONS

The present application is a continuation-in-part of copending application Ser. No. 36,999, filed May 13, 1970 now abandoned.

BACKGROUND OF THE INVENTION

The large increase in the use of narcotic agents including the opium alkaloids by the general population has brought with it a substantial need to improve analytical techniques for the determination of such agents in biological fluids. In many instances medical treatment centers are faced with the need of determining the identity of a narcotic agent taken by a patient who, being in a comatose condition, is unable to supply such information to the treating physician. At present procedures for the identification of opium alkaloids involve extraction and thin-layer chromatographic methods. These techniques have the disadvantage of being relatively time consuming, laborious and lacking great-sensitivity. A more rapid and highly sensitive assay for the presence of opium alkaloids in biological fluids would thus represent an extremely important advance in the art.

It has been known for some time that various small molecules (haptens), which by themselves are wholly devoid of antigenicity, can modify the antigenic properties of a protein when the small molecule is combined with the protein through stable covalent linkages. Thus, U.S. Pat. No. 2,372,066 discloses that antigens may be prepared by combining histamines or histamine-like compounds by linking the imidazole ring to a desired protein through a radical containing a group capable of coupling with the protein. These antigens are used either by direct injection into a subject whereby resistance, refractoriness or active immunity is developed in said subject or for injecting into host animals from which antibodies specific to the hapten moiety, e.g., the histamine or histamine-like substance, are developed. Similarly, Landsteiner in an article entitled "Specificity of Serological Reactions", Harvard University Press, Cambridge, Massachusetts (1945) disclosed the utilization of p-amino-benzene arsonic acid as a hapten which when coupled to a protein was able to produce specific antibodies in a host animal.

SUMMARY OF THE INVENTION

The present invention relates to a novel class of antigens comprising an opium alkaloid hapten moiety coupled to an immunogenic carrier-material. In preferred embodiments the opium alkaloid is covalently bonded to a protein molecule through a carboxy lower alkyl linking group via a peptide linkage. This peptide linkage involves the amino group of the protein molecule and the carboxy group of the carboxy lower alkyl linking group. This linking group is bonded to the opium alkaloid as a derivative of the phenolic hydroxyl group. Additionally, the present invention relates to antibodies which will complex with some specificity to the opium alkaloids. These antibodies are produced by treating host animals with the aforesaid antigens. Such specific antibodies are readily isolated from sera obtained from host animals after treatment of these host animals with the aforesaid antigen.

The term "lower alkyl" as used above is meant to include straight and branched chain saturated hydrocarbon radicals having from one to six carbon atoms such as methyl, ethyl, propyl and the like.

The opium alkaloid of particular preference in the practice of the present invention is morphine. Other opium alkaloids useful in this invention include, for example, heroin and codeine and derivatives thereof which do not involve the phenolic hydroxy group. It has been found that the antibodies elicited by the utilization of a morphine hapten-protein antigen are specific not only to morphine but also closely related derivatives such as codeine and to a lesser extent nalorphine.

As used herein the term "carrier material" is meant to include those materials which have the property of independently eliciting an immunogenic response in a host animal when injected therein and which can be coupled by covalent bonding to said opium alkaloid hapten. Suitable carrier materials include, for example, materials such as proteins; natural or synthetic polymeric compounds such as polypeptides, e.g., polylysine; polysaccharides; and the like. A particularly preferred carrier material for the practice of the present invention is protein.

The identity of the protein carrier material utilized in the preparation of the preferred antigen of the present invention is not critical. Examples of preferred proteins useful in the practice of this invention include the serum proteins preferably mammalian serum proteins, such as for example, human gamma globulin, human serum albumin, rabbit serum albumin, bovine gamma globulin and bovine serum albumin. Other suitable protein products will be suggested to one skilled in the art. It is generally preferred that proteins be utilized which are foreign to the animal host in which the resulting antigen will be employed.

The first step in the preparation of the preferred antigen of the present invention involves converting the opium alkaloid to the carboxy lower alkyl derivative of the alkaloid's phenolic hydroxy group. This is most conveniently accomplished by reacting the free base of the alkaloid with an alkali salt of a halo lower (e.g., one–seven carbon atoms, preferably one–four carbon atoms) alkanoic acid. Suitable halo lower alkanoic acids for this purpose include $\beta$-halo acetic acid, $\gamma$-halopropionic acid, $\delta$-halobutyric acid and the like.

The alkali salts useful in the practice of this invention of the aforesaid halo alkanoic acids include the sodium, potassium and lithium salts; the sodium salt being of greatest preference. Halo derivatives of the aforesaid alkanoic acids include the chloro, bromo, iodo and fluoro derivatives. In a most preferred embodiment of the present invention morphine free base is converted to its 3-0-carboxymethyl derivative by reaction with sodium $\beta$-chloro acetate. The aforesaid general reaction is facilitated by conducting it in the presence of a suitable inert organic solvent such as a lower alkanol, e.g., ethanol. Most preferably the solvent system is anhydrous and thus an absolute lower alkanol is employed. For purposes of the present invention, the term lower alkanol is meant to include straight and branched chain alkanols having from one to seven carbon atoms.

The reaction introducing the carboxy lower alkyl group into the opium alkaloid molecule can conveniently be conducted at a temperature in the range of from about room temperature to about 50°C; although higher or lower temperatures may be employed if desired. In preferred embodiments room temperature is employed for this reaction.

The coupling of the carboxy lower alkyl derivative of the opium alkaloid with a protein to form the preferred antigen of the present invention can be readily accomplished utilizing techniques now well known in protein chemistry for establishing peptide bonds. Thus, for example, one such technique would involve dissolving the protein and a water soluble coupling agent in water followed by adding a large molar excess of the desired carboxy lower alkyl opium alkaloid derivative. This reaction may be conducted at a temperature in the range of from about 0°C. to about 50°C., although higher or lower temperatures may be employed depending on the nature of the reactants and the denaturization temperature of the protein. A most preferable temperature is at about room temperature. It is desirable to utilize a slightly acidic reaction medium, e.g., a medium having a pH in the range of from about 3 to 6.5, most preferably in the range of from about 4 to 6.5, e.g., 5.5. Suitable water soluble coupling agents for use in the present invention include water soluble carbodiimides such as, for example, 1-ethyl-3-(3-dimethylaminopropyl)carbodiimide.

Upon completion of the above coupling reaction, the excess hapten molecules and coupling agents may be removed by dialysis. The dialysis may be monitored by checking the dialysate for the presence of hapten or coupling agents or, alternatively, may be conducted for a pre-determined period of time, e.g., seven days. The dialysis is conducted in distilled water which is preferably changed four to five times per day. Purified antigen is recovered as a residue in the dialysis bag.

Besides water, other suitable solvent media for use in the above reaction include, for example, 0.15 M salt solution (NaCl), a 0.15 M salt solution buffered with 0.01 M phosphate buffer (pH 7.4) or a 0.01 M phosphate buffer solution. The reaction mixture is brought to the desired pH range by the addition of dilute aqueous acid, e.g., 1N HCl. Solvents which denature proteins, e.g., organic solvents such as alcohols, ethers, etc. or strong inorganic acids or bases such as mineral acids or alkali hydroxides should generally not be employed.

The amount of molar excess of the hapten over the protein in the aforesaid reaction will, of course, depend on the identity of the opium alkaloid derivative utilized and the protein selected for the reaction. Generally, a molar excess in the range of from about 30 to 10,000, most preferably in the range of from about 100 to 1,000 of the hapten in relation to the protein, will be utilized.

It is generally found that from about 3 to about 7 opium alkaloid derivative groups are added to a molecule of protein depending of course on the amount of molar excess of hapten used. For example, three to four carboxymethylmorphine groups will be added to a molecule of bovine serum albumin (assuming a molecular weight of 70,000 for the protein) when a 100 molar excess of the hapten is used.

It is believed that the reaction sequence used in the preparation of the antigen of the present invention can be illustrated by the following reaction scheme. In such scheme 3-0-carboxy-methylmorphine is utilized as the exemplar hapten group.

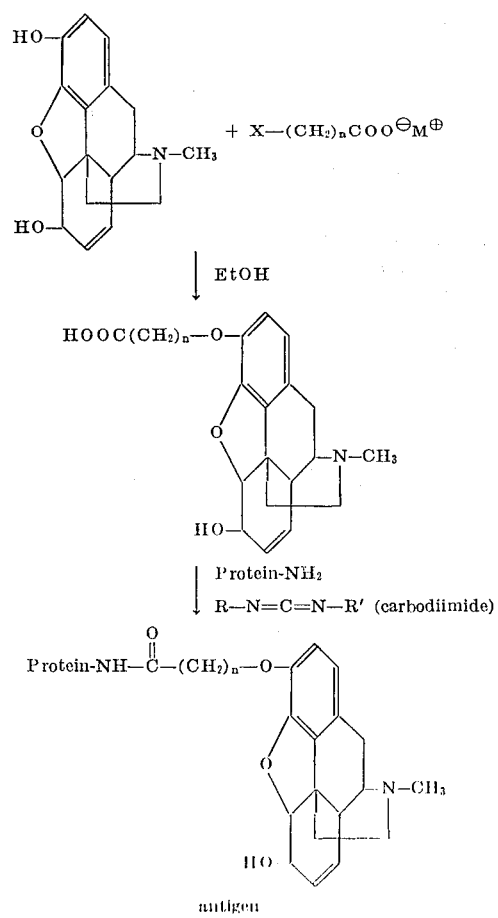

REACTION SCHEME where X is halo, M is an alkali metal and $n$ is an integer from 1 to 6.

The antigen of the present invention may then be utilized to induce formation of opium alkaloid specific antibodies in the serum of host animals by injecting the antigen in such host repeatedly over a period of time, collecting the serum, precipitating the antibody with a neutral salt solution and, if desired, purifying the antibody by dialysis and column chromatography. Suitable host animals for this purpose include mammals such as rabbits, horses, goats, guinea pigs, rats, cows, sheep, etc. The resulting antibody will have a multiplicity of active sites which will selectively complex with opium alkaloids, the opium alkaloid antigen described above or closely related derivatives.

The formation of opium alkaloid specific antibodies in the host animals may be monitored by taking blood samples from the host animal and adding to it an amount of the hapten-protein antigen. The presence of precipitate indicates antibody activity. The antigen treatment of the animal can be continued until the antibody titre reaches a desired level of activity. For the purposes of this application the antibody titre is defined as being the maximum concentration of protein precipitated following the addition of varying known concentrations of antigens to fixed volumes of serum, e.g., 0.5 ml.

The antibodies of the present invention can be isolated from the sera of treated host animals by utilizing techniques well known in the biochemical arts. For example, the sera obtained from treating host animals can be acted upon by a neutral salt which will effect precipitation of the desired specific antibodies. Suitable neutral salts for this purpose include sodium sulfate, magnesium sulfate, a sodium hydrogen phosphate mixture of ammonium sulfate. The neutral salt preferred for the purpose of the present invention is ammonium sulfate. Purification techniques subsequent to the precipitation mixture may also be employed such as dialysis and column chromatography. The resulting antibody may be characterized as being a gamma globulin having a molecular weight of about 160,000. This antibody will complex with a high degree of specificity with opium alkaloid haptens and antigens derived therefrom.

The specific antibodies of the present invention are useful as reagents in biochemical assays for the determination of the presence of opium alkaloids and closely related compounds in biological fluids. A particularly preferred assay procedure is an immunoprecipitation procedure which can be used to measure nanogram amounts of opium alkaloid, e.g., morphine in serum. In such procedure a known amount of labeled opium alkaloid is mixed with opium alkaloid antibody and a sample containing the unknown quantity of opium alkaloids. The amount of opium alkaloid in the sample can be determined by measuring the amount of competitive inhibition observed between the binding of the labeled opium alkaloid and the sample opium alkaloid with the opium alkaloid specific antibody and then calculating the amount of opium alkaloid in the sample from a standard curve. Suitable labeled opium alkaloids for this purpose include the isotopically labeled opium alkaloids particularly tritiated opium alkaloids, i.e., dihydromorphine-$H^3$ and morphine-$I^{125}$, as well as opium alkaloids labeled with an electron spin resonance group. Examples of the use of various electron spin resonance labeled molecules in bioassays are to be found in U.S. Pat. Nos. 3,453,288, 3,481,952 and 3,507,876. A preferred radioimmunoprecipitation technique for use in the assay of opium alkaloids is described in further detail in the accompanying examples.

This invention is further illustrated by the following specific examples.

EXAMPLE 1

Preparation of antigen

Morphine was converted to 3-0-carboxymethyl morphine by reaction of the alkaloid free base with sodium β-chloroacetate in absolute ethanol according to the procedures described in Houben Fortschritte der Heilstoffchemie, 1, 882 (1901) and Beilstein, Band 27, 156. The derivative product after recrystallization from hot absolute ethanol had a melting point of 292°–293 °C. The 3-0-carboxymethyl morphine acid was Dragendorff positive and Pauly negative and had a Rf of 0.6 on thin-layer silica gel chromatography using glacial acetic acid:methanol (1:1) as the solvent system. In the same solvent system morphine had a Rf of 1.0. The carboxymethyl morphine was coupled to bovine serum albumin (BSA) in aqueous solution, in the presence of water soluble carbodiimide by the following procedure. A total of 8 mg. of carboxymethyl morphine was dissolved in 2 ml. of distilled water containing 10 mg. of BSA. The pH of the mixture was adjusted to 5.5 with 1N HCl and 8 mg. of 1-ethyl-3-(3-dimethylaminopropyl) carbodiimide was added. The mixture was incubated overnight at room temperature and then dialyzed for seven days against distilled water with four to five changes per day. Conjugates analyzed by the spectrofluorometric procedure of Balatre et al., Annales Pharm. Franc. 19, 171 (1961) were found to contain 3 to 4 carboxy methyl morphine groups per molecule of BSA (assuming a molecular weight of 70,000 for the protein).

EXAMPLE 2

Preparation of antibody

Rabbits of the New Zealand albino strain were immunized with 1 mg. of carboxymethyl morphine-BSA. The immunogen was dissolved in phosphate buffer saline pH 7.4, emulsified with an equal volume of complete Freund's adjuvant and injected into the footpad (0.4 ml./footpad). Booster injections of 100 μg. of antigen in adjuvant were given every 6–8 weeks in the footpads and sides.

Antiserum was collected 5-) days after booster injections. Blood collected by cardiac puncture was incubated at 37°C. for 1 hour and then kept overnight at 4°C. After centrifugation at 5,000 r.p.m. for 30 minutes at 4°C., serum was separated from the clot.

EXAMPLE 3

Radioimmuno assay

The radioimmuno assay was performed by incubating various dilutions of antisera obtained in Example 2 in the presence of dihydromorphine-$H^3$ (New England nuclear, 388 mc/mM, 100 picomoles (4,000 cpm) at 4°C. overnight. After incubation a neutral, saturated ammonium sulfate solution (volume equal to incubation medium) was added to all tubes. The precipitate, sedimented by centrifugation at 5,000 rpm for 15 minutes at 4°C. was washed twice in 50 percent ammonium sulfate solution. The wash precipitates, containing antibody-bound morphine, was dissolved in 0.5 ml. of commercial detergent solubilizer such as NCS "-Solubilizer" and quantitatively transferred and counted in a Packard Tri-Carb Liquid Scintillation Spectrometer. The tube which contained radioactive dihydromorphine and antiserum but no unlabeled morphine served as a measure of maximum anti-body-bound radioactivity. The addition of increasing amounts of unlabeled morphine to a fixed amount of dihydro-$H^3$ and antiserum resulted in a competitive inhibition of the labeled dihydromorphine for the formation of the antibody-hapten complex. The data obtained is summarized below in Table I.

TABLE I

| Nanograms Non-radioactive Morphine Added | Percent Inhibition of Binding of Dihydromorphine-$H^3$ |
|---|---|
| 0.5 | 20 |
| 2.0 | 38 |
| 3.0 | 50 |
| 4.0 | 65 |
| 5.0 | 80 |

The above data clearly demonstrates the sensitivity of the method. When plotted in graphic form the data contained in the above table demonstrates a linear relationship between the amount of non-radioactive morphine added and the percent of inhibition found. With the addition of 0.5 nanogram of unlabeled morphine per tube [a concentration of 1 nanogram per ml. before adding ammonium sulfate] 20 percent of the labeled dihydromorphine was displaced from the antibody. The specificity of the antiserum for morphine was demonstrated by incubating the labeled hapten with normal rabbit serum. The radioactivity remaining in a precipitate from normal rabbit serum after washing was slightly above background and was subtracted from values obtained on all other tubes.

Comparison runs were also carried out with other alkaloids. The inhibitory capacity of codeine, which is morphine-3-methyl ether was compared with that of morphine. Codeine was found even more effective than morphine (on a molar basis) in producing 50 percent inhibition of precipitation of radioactivity. This is not surprising since codeine possesses greater structural similarity to the immunizing carboxymethylmorphine group than does morphine itself. It was further found that 500 nanograms of nalorphine decreases precipitation of radioactivity by about 35 percent whereas the same amount of methadon produced little or no inhibition.

I claim:

1. An antigen consisting essentially of a carboxy lower alkyl derivative of the phenolic hydroxy group of an opium alkaloid bonded through a peptide linkage to an amino group of a protein.

2. The antigen of claim 1 wherein said opium alkaloid derivative is 3-0-carboxymethylmorphine.

3. The antigen of claim 1 wherein said protein is bovine serum albumin.

4. The antigen of claim 3 wherein three to seven opium alkaloid derivative groups are bonded per molecule of bovine serum albumin.

5. An antigen consisting essentially of a carboxy lower alkyl derivative of the phenolic hydroxyl group of an opium alkaloid bonded through a peptide linkage to an amino group of an immunogenic carrier material selected from the group consisting of proteins and polypeptides.

* * * * *

UNITED STATES PATENT OFFICE
Certificate

Patent No. 3,709,868                  Patented January 9, 1973

Sidney Spector

Application having been made by Sidney Spector, the inventor named in the patent above identified, and Hoffmann-La Roche Inc., Nutley, New Jersey, a corporation of New Jersey, the assignee, for the issuance of a certificate under the provision of Title 35, Section 256, of the United States Code, adding the name of Charles W. Parker as a joint inventor, and a showing and proof of facts satisfying the requirements of the said section having been submitted, it is this 5th day of June 1973, certified that the name of the said Charles W. Parker is hereby added to the said patent as a joint inventor with the said Sidney Spector.

FRED W. SHERLING
*Associate Solicitor.*

UNITED STATES PATENT OFFICE
CERTIFICATE OF CORRECTION

Patent No. 3,709,868      Dated January 9, 1973

Inventor(s) Sidney Spector, et al.

It is certified that error appears in the above-identified patent and that said Letters Patent are hereby corrected as shown below:

Claim 1, Column 8, line 5 "hydroxy" should be hydroxyl

At the end of the specification, please insert --The invention described herein was made in part by a co-inventor hereof in the course of work under a grant or award from the Department of Health, Education and Welfare.--

Signed and sealed this 26th day of February 1974.

(SEAL)
Attest:

EDWARD M. FLETCHER, JR.
Attesting Officer

C. MARSHALL DANN
Commissioner of Patents

FORM PO-1050 (10-69)